2,820,792

5-SULFAMYL-3-SUBSTITUTED-1,3,4-THIADIAZOL-2-ONES

Richard William Young, Riverside, and Melinda Jane Muller, Stamford, Conn., assignors to American Cyanamid Company, New York, N. Y., a corporation of Maine No Drawing. Application August 13, 1956
Serial No. 603,844

13 Claims. (Cl. 260—306.7)

This invention relates to new organic compounds and more particularly is concerned with novel 5-sulfamyl-3-substituted-1,3,4-thiadiazol-2-ones which may be represented by the following general formula

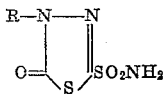

wherein R is a lower alkyl radical, a monocyclic aryl radical or a monocyclic aralkyl radical. Suitable lower alkyl substituents are methyl, ethyl, propyl, isopropyl, butyl, pentyl, amyl, hexyl, etc.; suitable aralkyl substituents are benzyl, phenethyl, phenylpropyl, phenylbutyl, etc.; and suitable aryl substituents are phenyl and substituted phenyl, suitable substituents on the phenyl ring being —Cl, —Br, —I, —NO$_2$, —CH$_3$O, and lower alkyl radicals containing from 1 to 4 carbon atoms.

In our copending application of even date herewith, Ser. No. 603,841 we have described and claimed a series of novel 5-nitrosimino-4-substituted-Δ$^2$-1,3,4-thiadiazoline-2-sulfonamides of the formula:

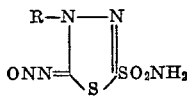

wherein R has the same meaning as above. The nitrosimino compounds may be prepared by nitrosating an appropriate 5-imino-4-substituted-Δ$^2$-1,3,4-thiadiazoline-2-sulfonamide with nitrous acid at a temperature ranging from about 0° C. to 30° C. The compounds so prepared have been found to be useful natriuretic agents, that is, agents which enhance the excretion of sodium in the urine without necessarily changing to normal volume of urine excreted.

The 5-imino compounds, in turn, are prepared by the acid hydrolysis of 5-acylimino-4-substituted-Δ$^2$-1,3,4-thiadiazoline-2-sulfonamides which are more particularly described and claimed in the copending application of Young, Wood and Vaughan, Serial No. 492,297, filed March 4, 1955, now Patent No. 2,783,241, and the copending application of Young and Muller, Serial No. 560,866, filed January 23, 1956, now Patent No. 2,783,239.

We have now discovered that effective naturetic agents may be prepared by pyrolyzing the 5-nitrosimino compounds of our aforesaid copending application filed concurrently herewith. This is preferably accomplished by pyrolyzing the nitrosimino compound in the presence of a suitable non-hydroxylated organic solvent, such as dimethylformamide. for example, by heating to reflux temperatures, that is temperatures of the order of 50° C. to 200° C. Suitable inert organic solvents, in addition to dimethylformamide, are toluene, chloroform, carbon tetrachloride, dioxane, benzene, chlorobenzene, xylene, etc. If desired. the process may also be carried out in the absence of solvents simply by heating the compounds to the melting point.

The process by which the novel compounds of this invention may be prepared is illustrated schematically below using 5-nitrosimino-4-methyl-Δ$^2$-1,3,4-thiadiazoline-2-sulfonamide as an example of a suitable 4-substituted nitrosimino compound and dimethylformamide as an example of a suitable organic solvent.

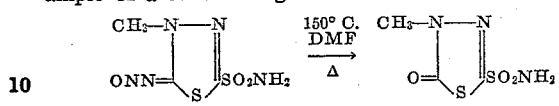

The invention will be described in greater detail in conjunction with the following specific examples in which the parts are by weight unless otherwise specified.

Example 1

One part of 5-nitrosimino-4-methyl-Δ$^2$-1,3,4-thiadiazoline-2-sulfonamide is pyrolyzed by adding the sample slowly to 10 parts of refluxing dimethylformamide. Each addition results in the rapid evolution of gas. The dark solution is refluxed until it becomes decolorized and gas evolution ceases. The reaction mixture is concentrated to dryness under water pump vacuum and the resulting solid is slurried in chloroform to give 0.47 part (53%), of a product having a melting point of 130-133° C. The product is precipitated twice from methyl isobutyl ketone by the addition of petroleum ether and 0.1 part (11%), M. P. 131-133° C., of 5-sulfamyl-3-methyl-1,3,4-thiadiazol-2-one is recovered.

Example 2

5 - nitrosimino-4-phenyl-Δ$^2$-1,3,4-thiadiazoline-2-sulfonamide is pyrolyzed in refluxing dimethylformamide by the procedure of Example 1. 5-sulfamyl-3-phenyl-1,3,4-thiadiazol-2-one is obtained.

Example 3

5 - nitrosimino-4-(m-tolyl)-Δ$^2$-1,3,4-thiadiazoline-2-sulfonamide is pyrolyzed in refluxing toluene by the procedure of Example 1. 5-sulfamyl-3-(m-tolyl)-1,3,4-thiadiazol-2-one is produced.

Example 4

5 - nitrosimino - 4 - (p-chlorophenyl)-Δ$^2$-1,3,4-thiadiazoline-2-sulfonamide is pyrolyzed in reflux xylene by the procedure of Example 1. 5-sulfamyl-3-(p-chlorophenyl)-1,3,4-thiadiazol-2-one is produced.

Example 5

The procedure of Example 1 is repeated with the sole exception that 5-nitrosimino-4-benzyl - Δ$^2$ - 1,3,4 - thiadiazoline-2-sulfonamide is used instead of the 5-nitrosimino-4-methyl compound of Example 1. 5-sulfamyl-3-benzyl-1,3,4-thiadiazol-2-one is obtained.

Example 6

The procedure of Example 1 is followed except that 5-nitrosimino-4-(p-acetamidophenyl)-Δ$^2$-1,3,4-thiadiazoline-2-sulfonamide is used. 5-sulfamyl-3-(p-acetamidophenyl)-1,3,4-thiadiazol-2-one is produced.

Example 7

The procedure of Example 1 is followed except that 5-nitrosimino-4-(m-methoxyphenyl) -Δ$^2$-1,3,4-thiadiazoline-2-sulfonamide is used in place of the 5-nitrosimino-4-methyl compound used in Example 1. 5-sulfamyl-3-(m-methoxyphenyl)-1,3,4-thiadiazol-2-one is produced.

Example 8

The procedure of Example 1 is repeated except that no solvent is used and the nitrosimino compound is heated to the melting point. The same product as in Example 1 is obtained.

We claim:

1. 5-sulfamyl-3-substituted-1,3,4-thiadiazol-2-ones of the formula:

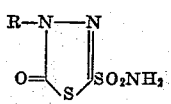

wherein R is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals.

2. 5-sulfamyl-3-methyl-1,3,4-thiadiazol-2-one.
3. 5-sulfamyl-3-phenyl-1,3,4-thiadiazol-2-one.
4. 5-sulfamyl-3-benzyl-1,3,4-thiadiazol-2-one.
5. 5-sulfamyl-3-(m-tolyl)-1,3,4-thiadiazol-2-one.
6. 5-sulfamyl-3-(p-chlorophenyl)-1,3,4-thiadiazol-2-one.

7. The method of preparing 5-sulfamyl-3-substituted-1,3,4-thiadiazol-2-ones of the formula:

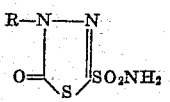

wherein R is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals, which comprises heating a compound of the formula:

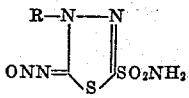

wherein R has the same meaning as above in the presence of a non-hydroxylated organic solvent under reflux conditions.

8. The method of preparing 5-sulfamyl-3-methyl-1,3,4-thiadiazol-2-one which comprises heating 5-nitrosimino-4-methyl-$\Delta^2$-1,3,4-thiadiazoline-2-sulfonamide in the presence of dimethylformamide under reflux conditions.

9. The method of preparing 5-sulfamyl-3-phenyl-1,3,4-thiadiazol-2-one which comprises heating 5-nitrosimino-4-phenyl-$\Delta^2$-1,3,4-thiadiazoline-2-sulfonamide in the presence of dimethylformamide under reflux conditions.

10. The method of preparing 5-sulfamyl-3-benzyl-1,3,4-thiadiazol-2-one which comprises heating 5-nitrosimino-4-benzyl-$\Delta^2$-1,3,4-thiadiazoline-2-sulfonamide in the presence of dimethylformamide under reflux conditions.

11. The method of preparing 5-sulfamyl-3-(m-tolyl)-1,3,4-thiadiazol-2-one which comprises heating 5-nitrosimino-4-(m-tolyl)-$\Delta^2$-1,3,4-thiadiazoline-2-sulfonamide in the presence of dimethylformamide under reflux conditions.

12. The method of preparing 5-sulfamyl-3-(p-chlorophenyl)-1,3,4-thiadiazol-2-one which comprises heating 5-nitrosimino-4-(p-chlorophenyl)-$\Delta^2$-1,3,4-thiadiazoline-2-sulfonamide in the presence of dimethylformamide under reflux conditions.

13. The method of preparing 5-sulfamyl-3-substituted-1,3,4-thiadiazol-2-ones of the formula:

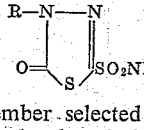

wherein R is a member selected from the group consisting of lower alkyl, phenyl, halo-substituted phenyl, nitro-substituted phenyl, amido-substituted phenyl, lower alkyl-substituted phenyl, and phenyl-lower-alkyl radicals, which comprises heating a compound of the formula:

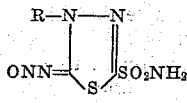

wherein R has the same meaning as above at temperatures of from 50° C. to 200° C. in the absence of a solvent.

No references cited.